Jan. 29, 1963   J. L. BERNARD ETAL   3,075,378
METHODS AND APPARATUS FOR THE DETERMINATION
OF THERMAL STRESSES
Filed Oct. 8, 1958   2 Sheets-Sheet 1
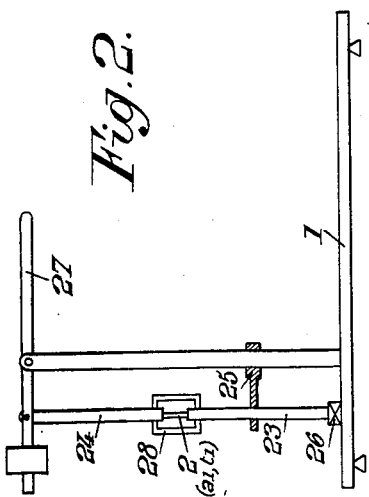
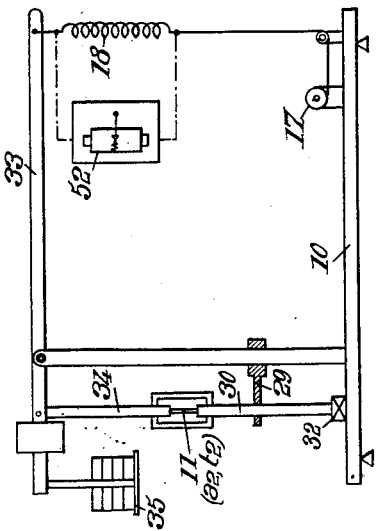
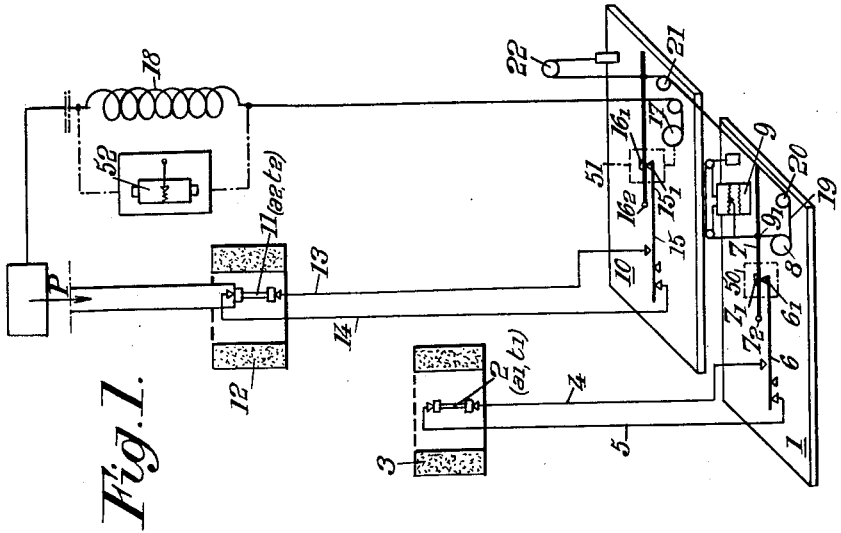
INVENTOR

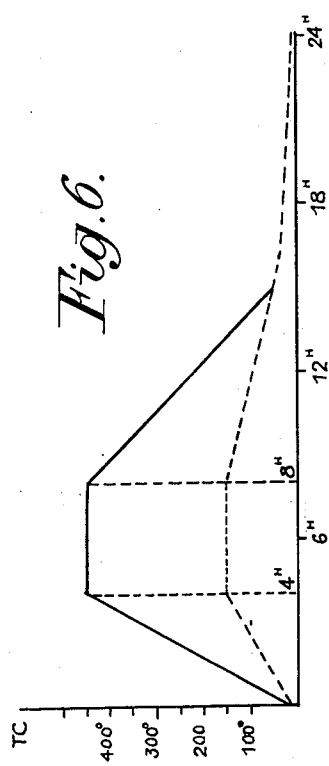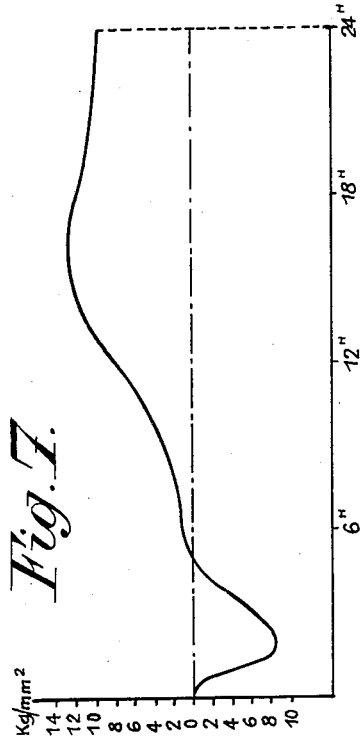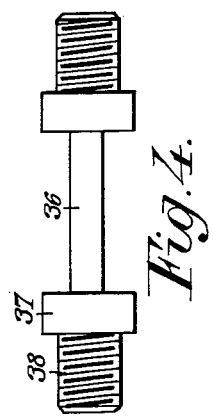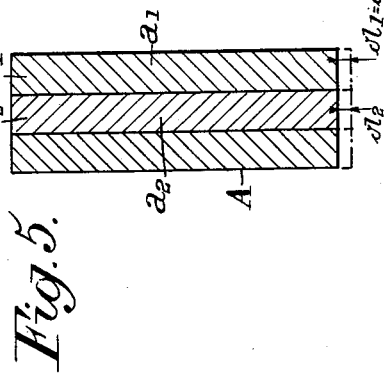

3,075,378
METHODS AND APPARATUS FOR THE DETERMI-
NATION OF THERMAL STRESSES
Jean Louis Bernard, Gif-sur-Yvette, Maurice Gauthron,
Paris, and André Gautier, Orsay, France, assignors to
Commissariat a l'Energie Atomique, Paris, France, a
State administration
Filed Oct. 8, 1958, Ser. No. 766,100
Claims priority, application France Oct. 8, 1957
8 Claims. (Cl. 73—15.6)

The present invention relates to methods and apparatus for the determination of thermal stresses and deformations or strains in bodies having different portions thereof subjected to different temperatures respectively.

It is known that as soon as two different portions of a body for instance two walls thereof, are at different respective temperatures, thermal stresses are created in said body.

This phenomenon is the more important as the temperature difference is greater and as the body itself prevents a free relative displacement of said different portions thereof (which is generally the case).

A cooling circuit in a working element of an apparatus will obviously produce thermal stresses as above mentioned.

In the particular case of a nuclear reactor in operation, the fuel elements or slugs have, in directions perpendicular to their surfaces, temperature gradients which may be very important (ranging from 400 to 500° C. for instance) between the periphery and the center of the slug.

When the reactor is working under stable conditions, the thermal state of the fuel element may be roughly analysed as follows (with reference to FIG. 5 of the appended drawings):

The circumferential zone $a_1$ of a slug A is considered as a cold sheath, at a temperature $t_1$;
The inner, or central, zone $a_2$ is considered as a hot core, at temperature $t_2$, bound to said sheath.

When the temperature is rising and the power of the reactor is increasing, the respective temperatures of zones $a_1$ and $a_2$ will quickly differ from each other. Due to the effect of expansions, the central zone $a_2$ will tend to elongate much more than the peripheral zone $a_1$. But, these two zones being bound together, the peripheral zone $a_1$, the cross-section of which is larger, will retain the central zone $a_2$ so that the respective expansions $dl_1$ and $dl_2$ of the two zones will tend to remain equal to each other. This will cause a compression of the central zone $a_2$.

When the temperature reaches a constant value, i.e. when the reactor is under stable working conditions, the stresses evolve as a function of time in a manner which is very variable and difficult to define.

When (the reactor is being gradually stopped) the relative temperature conditions of the peripheral zone $a_1$ and of the central zone $a_2$ will again be varied and produce internal stresses.

Such phenomenons take place in casings and boilers subjected to important temperature gradients between the central portion of the structure and the peripheral or outer portion thereof. In the case of two metals forming platings on one another (this is the case of some fuel elements) where a zone of intermetallic diffusion often exists along the surface of contact between these metals, this zone is subjected to important internal stresses.

When analyzing the problem and if many approximations are admitted (absence of viscosity, perfect isotropy, homogeneity of the physico-mechanical characteristics, deformations taking place under elasto-plastic conditions) it is possible to calculate the stresses which are produced under different working conditions.

Unfortunately calculation is unable to give an account of the phenomenons of evolution or decrease of the stresses as a function of time, a preponderating factor which must exert its effect during all variations of working conditions.

The object of the present invention is to supply information concerning this factor.

The method according to this invention consists essentially in making use of at least two test-pieces (which are supposed to correspond to the above mentioned peripheral zone $a_1$ and central zone $a_2$) which are subjected, at respective temperatures $t_1$ and $t_2$, to comparative thermal expansion measurement tests, the first one under a constant or zero load, the second one under variable load and in conditions such as to maintain a constant ratio, for instance equal to 1, of the respective length variations $dl_1$ and $dl_2$ to each other is maintained.

The above mentioned variable load will correspond to the thermal stress to be measured, so that, by varying temperatures $t_1$ and $t_2$, it is possible to determine the law of variation of said stresses in response to relative temperature variations.

The apparatus for carrying out this method may be a differential machine including two expansion measuring machines, such for instance as those used to measure the creep of metals, to perform the respective tests on the two test-pieces at temperatures $t_1$ and $t_2$ respectively, the second machine being provided with means for varying (either positively or negatively) the load P on the corresponding test-piece, in combination with means for performing said load variations in response to the variations of length of the test-piece of the first machine so that the variations of length of the second test-piece are constantly in a given ratio, and for instance equal, to those of the test-piece of the first machine.

The two machines are provided with independent heating means so that their respective test-pieces are at temperatures $t_1$ and $t_2$ respectively.

Advantageously, at least the second machine comprises a device, for instance consisting of levers, for amplifying the length variations of the test piece mounted in said machine, in combination with servo-motor means for exerting on said test-piece relatively high efforts in response to very small length variations of the test-piece mounted in the first machine.

Advantageously, at least the second machine, or (as it will be supposed in the following description) each of the two machines is a so-called "TR machine," as described by Mr. Chevenard in the "Revue de Métallurgie," published in Paris, France, issue of November 1942, pages 321–330 (such machines being manufactured in France by the firm called "Ets. A.D.A.M.E.L.").

The first machine, which will hereinafter be called "expansion machine" works with its test-piece subjected only to the action of thermal expansion. Its servo-motor serves to actuate the stylus of a device for recording the expansion $dl_1$ of said test-piece.

The second machine, which will hereinafter be called "loading machine" works for instance in the following manner:

On the one hand, it is connected, through mechanical or other means, with the first machine, so that an element of said second machine, for instance a lever of the amplifying device thereof, receives displacements proportional to the value $dl_1$ recorded by the first machine;

And on the other hand, the servo-motor of said second machine, influenced as a function of this value $dl_1$ by the displacements of the levers of said amplifying system, controls the tensioning of a spring serving to apply to the test-piece of said second machine the negative or positive load P intended to keep $dl_2$ equal to $dl_1$.

The use of such a spring is advantageous because its law of deformation may be chosen substantially linear as a function of the effort applied thereto, which permits easy reading of the value of load P, which is equal to the stress to be measured.

Said spring may be combined with a static loading device such that, for an initial starting position, said spring and said static device balance each other and the total load acting upon the test piece is then equal to zero. The action of the servo-motor will then modify, either positively or negatively, the initial tensioning of the spring so as to apply on test-piece $a_2$ a positive or negative load, which is equal to the stress P to be measured.

According to an advantageous embodiment of the invention, the amplifying device of each of the two machines includes at least two levers adapted to remain applied against each other. In the first machine, this contact between said two levers may be obtained either directly or through the action of corresponding servo-motor means. In the second machine, one of these levers constantly occupies the same position as the corresponding lever of the first machine, owing to the action of the above mentioned connecting means interposed between the two machines. The second lever of said second machine is then caused to bear upon the first one by the action of the servo-motor means controlling the above mentioned spring, so as to create the load P corresponding to equality of the deformations $dl_1$ and $dl_2$.

A preferred embodiment of the present invention will be hereinafter described with reference to the accompanying drawings, given merely by way of example, and in which:

FIG. 1 is a general view of the apparatus according to the invention.

FIG. 2 diagrammatically shows the expansion machine.

FIG. 3 diagrammatically shows the loading machine.

FIG. 4 is an elevational view of a test-piece to be used in the apparatus according to the invention.

FIG. 5 is an explanatory view already referred to.

FIGS. 6 and 7 show recordings obtained during the operation of the apparatus.

In FIG. 1, the expansion machine 1 includes a test-piece 2 located in an oven 3 at temperature $t_1$, contact members 4 and 5, a test-piece deformation amplifying device including two levers 6 and 7 and servo-motor 8, and the recording drum 9. Servo-motor 8 is mechanically connected at $9_1$ with lever 7 pivoted at $7_2$.

Servo-motor 8 cooperates, as in the above mentioned Chevenard machine, with an electric or electronic device shown by block 50 and including contacts $6_1$ and $7_1$, called "sliding contacts," respectively carried by amplifier levers 6 and 7, the whole being arranged in such manner that the servo-motor runs in one direction or the other according as contacts $6_1$ and $7_1$ either bear upon each other or are not in contact with each other. Thus, these contacts and therefore the two levers 6 and 7 are caused constantly to follow each other. In this case, the servo-motor further supplies the energy necessary for recording the test-piece deformations on drum 9. Servo-motor 8 is connected at $9_1$ with lever 7 which pivots at $7_2$.

The loading machine is shown at 10 and includes test-piece 11 located in an oven 12 at temperature $t_2$, contact members 13 and 14, a test-piece deformation amplifying device including levers 15 and 16 and servo-motor 17.

This servo-motor 17 is not mechanically connected, as the servo-motor 8 of machine 1, with one of the levers of the amplifying device but with a spring 18 the function of which has been above described. Servo-motor 17 is controlled by a device 51, for instance analogous to device 50, cooperating with contacts $15_1$ and $16_1$ carried by levers 15 and 16.

The loading machine 10 is connected with the expansion machine 1 through a cable 19 passing on pulleys 20, 21 and 22 and which compels lever 16 to have displacements identical to those of the lever 7 of the expansion machine. This connection may be effected either directly between said levers 7 and 16 or (as shown by FIG. 1) through servo-motor 8. The displacements of said levers 7 and 16 may be indicated by suitable means so as to make sure that their displacements are identical.

Levers 16 and 7 being kept in the same relative position by the above mentioned connecting means, servo-motor 17, controlled by device 51 acts upon spring 18 so that, under the effect of the load P applied to test-piece 11, which load depends upon the variable tensioning applied by servo-motor 17 to spring 18, the deformations $dl_2$ of test-piece 11 cause contact $15_1$ to follow contact $16_1$. Thus, the two groups of levers 6—7 on the one hand and 15—16 on the other hand have constantly the same position so that $dl_2$ is constantly equal to $dl_1$.

The value of the stress, equal to load P, is read for instance on a drum 52 which records the deformations of spring 18.

The second machine may further include a recording drum (not shown) analogous to drum 9 of machine 1 and connected with lever 16 to check up the similarity of the laws of expansion of the two test-pieces.

FIG. 2 shows the mechanical elements of the expansion machine.

As above stated, test-piece 2 is subjected only to the action of its thermal expansion. To maintain the similarity with the second machine, the test-piece is caught between two fastening members 23 and 24. As the fixed reference element is, in this type of machine, the lower fastening member 23, this member is strongly held in position by a part 25 and a nut 26. The upper fastening member 24, which is movable, is carefully balanced by a small lever 27 so that no load is exerted on test-piece 2. The two fastening members 23 and 24 are kept exactly in line with each other by means of a sleeve or casing 28 which may further permit of keeping an atmosphere of argon around the test-piece.

FIG. 3 shows the mechanical elements of the loading machine 10.

In order to avoid any error due to the mounting of the parts (friction and variation of the plays during the period for which the temperature is being increased, residual stress on the test-piece, displacement of the fastening members and so on . . .), the fastening of the test-piece is exactly the same in the two machines. Therefore the loading machine includes a fixation member 29 for the lower fastening member 30, a centering sleeve or casing 31 surrounding test-piece 11 and a nut 32. The lever 33 which supports the upper fastening member 34 is different. As a matter of fact, if, at the beginning of the test, it is balanced so that no load is applied on the test-piece, it must however transmit negative (compression) or positive (tensioning) loads during the test. As above described, servo-motor 17 acts upon coil spring 18. If the effort thus exerted is lower than the weights 35 acting upon the other end of the lever, the test-piece is compressed. In the other cases, the test-piece is subjected to a tensile force.

FIG. 4 shows a kind of test-piece to be advantageously used in such an apparatus.

Such a test piece includes a cylindrical body 36, two screw-threaded ends 38 and annular projections 37 forming shoulders adjacent to said threaded ends. These shoulders are intended to be tightly applied against the fastening members, such as 23—24 or 30—34. Thus, the test-piece is mounted without play with respect to the fastening members, which would not be the case if the ends 38 thereof were merely screwed on the fastening members.

The dimensions of such a test-piece may be for instance as follows:

Body 36:  Mm.
    Diameter _____ 4
    Length _____ 20
Shoulders 37:
    Diameter _____ 12
    Length _____ 5
Screw threaded ends 38:
    Diameter _____ 8
    Length _____ 10

Another test-piece which may be used has a body having a diameter of 5 mm. instead of 4 mm.

In order to prevent corrosion of the test-pieces, the above mentioned casings 28 and 31 are arranged in such manner that, without preventing the fastening members 23—24 or 30—34 from sliding therein, they permit of constantly maintaining an inert gas atmosphere around the test-pieces, the inert gas being fed and flowing out through conduits provided in the fastening members 23—24 or 30—34.

As above stated, the loads are produced by a spring such as shown at 18. As this spring has a deformation which is linear as a function of the load, it suffices to record the variations of its length to determine the loads applied on the test-piece.

By way of example, a test conducted with two test-pieces of a material called "Z.W.1" alloy (Mg-Zr-Zn) will now be described.

1. *Ovens and Their Operations*

The oven of each machine is fitted with a so-called "24 hours" control. The temperatures and rates of variation thereof are as follows:

Furnace of the "expansion machine"—

(a) raise of temperature from 20° C. to 160° C. in 4 hours,
(b) maintenance of this temperature for 4 hours,
(c) reduction of the temperature from 160° C. to 20° C. in 8 hours,
(d) maintenance of this temperature for 8 hours.

Furnace of the "loading machine"—

(a) raise of temperature from 20° C. to 460° C. in 4 hours,
(b) maintenance of this temperature for 4 hours,
(c) reduction of the temperature from 460° C. to 20° C. in 8 hours,
(d) maintenance of this temperature for 8 hours.

The temperatures thus obtained are shown on FIG. 6.

2. *Loading*

Theoretical calculation leads to the following stresses:

From 25 to 30 kg. per sq. mm. in compression,
From 30 to 35 kg. per sq. mm. in tension.

After a perfect balancing of the lever and the test-piece having been mounted, 30 kg. per sq. mm. of compression were applied on the loading machine. At the end of this loading, the pulling traction spring 18 was elongated by a length corresponding to the load, so as to balance said load. The test-piece was therefore free from any load acting thereon.

The two machines were then started simultaneously, that is to say the two ovens were heated simultaneously.

3. *Recording*

Drum 9 (FIG. 1) records the expansion of the test-piece of the expansion machine.

Another drum (not shown) records the same expansion but after transmission to the loading machine.

These two first mentioned drums are only reference elements.

A third drum 52 (FIG. 1) records the displacements of the spring of the loading machine, that is to say, on a suitable scale, the loads applied on the corresponding test-piece.

A recorder indicates the temperatures in the two ovens for the complete cycle.

4. *Records*

The different curves thus obtained are interpreted to give the records shown by FIG. 7.

The shape of the curves is always the same for any kind of material. Only the slopes and the maximum differ.

There are two preponderating parameters in the obtainment of curves relating to a same material: the difference of temperature between the ovens of the two machines and the rate of variation of the temperature and duration of the periods at constant temperatures.

Some maximum stresses recorded with the same temperatures and cycles are hereinafter given:

|  | Compression | Tension |
|---|---|---|
| Z.W. 1_____kg. per sq. mm__ | 8 | 13 |
| Mild steel_____do____ | 23 | 31 |
| Stainless steel_____do____ | 16 | 25 |

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. A method of studying the thermal stresses created in an element having two respective portions thereof subjected to two different temperatures, which method comprises the steps of subjecting two similar test-pieces both made of the material of said element to comparative expansion measurement tests at said two temperatures respectively, the measurement test for the first test-piece being conducted under a constant load applied to said first test-piece, varying the load applied to the second test-piece so that the variations of length thereof are constantly equal to those of the first test-piece, and recording the variations of the load applied to said second test-piece.

2. An apparatus for studying the thermal stresses created in an element having two respective portions thereof subjected to two different temperatures, a lower one and a higher one, said apparatus, comprising, in combination, two machines, a first one and a second one, for measuring the thermal expansions of two test-pieces respectively mounted in said machines, said test-pieces being similar and both made of the material of said element, means for subjecting the test-piece that is mounted in said first machine to said lower temperature, means for subjecting the test-piece that is mounted in said second machine to said higher temperature, means for applying to the test-piece that is mounted in said first machine a known constant load, means operatively connected with said second machine for varying the load on the test-piece mounted thereon, means operatively connected with said first machine for controlling said load varying means in response to the variations of length of said test piece mounted on said first machine to keep the respective length variations of said two test-pieces constantly in the same ratio to each other, and means for recording the variations of the load applied to said test-piece mounted on said second machine.

3. An apparatus for studying the thermal stresses created in an element having two respective portions thereof subjected to two different temperatures, a lower one and a higher one, said apparatus comprising, in combination, two machines, a first one and a second one, for measuring the thermal expansions of two test-pieces respectively mounted in said machines, said test-pieces being similar and both made of the material of said element, means for subjecting the test piece that is mounted in said first machine to said lower temperature, means for subjecting the test-piece that is mounted in said second machine to said higher temperature, means for applying to the test-piece that is mounted in said first machine a known constant load, means included in said first machine for amplifying the length variations of the test-piece that is mounted in the first machine, said amplifying means comprising a member having displacements proportional to said length variations, means included in said second machine for varying the load on the test-piece mounted thereon, servo-motor means included in said second machine for preparing said load varying means, a second member identical to said above mentioned member and movably mounted in said second machine in the same manner as the first mentioned member is mounted in said first machine, means operatively connected with said first member for imparting to said second member displacements identical to those of said first member, means included in said second machine for amplifying the length variations of the test-piece of said second machine, said last mentioned amplifying means including a movable part, follow up means responsive to relative displacements of said part with respect to said second member for controlling said servo-motor means to constantly tend to eliminate such relative displacements, and means for recording the variations of the load applied to said test-piece of said second machine.

4. An apparatus according to claim 3 in which said means for varying the load on the test-piece of the second machine include a coil spring.

5. An apparatus according to claim 3 in which said means for varying the load on the test-piece of the second machine include a coil spring, further comprising static means for exerting, on said last mentioned test-piece, a load capable, in the initial state, of balancing the action of said spring.

6. An apparatus for studying the thermal stresses created in an element having two respective portions thereof subjected to two different temperatures, a lower one and a higher one, said apparatus comprising, in combination, two machines, a first one and a second one, for measuring the thermal expansions of two test-pieces respectively mounted in said machines, said test-pieces being similar and both made of the material of said element, means for subjecting the test-piece that is mounted in said first machine to said lower temperature, means for subjecting the test-piece that is mounted in said second machine to said higher temperature, means for applying to the test-piece that is mounted in said first machine a known constant load, similar lever means included in said machines respectively for amplifying the length variations of said respective test-pieces, each of said amplifying means including at least two levers, said two levers being identical with each other and similarly mounted in their respective machines, means operatively connected with the lever of the first machine for imparting to the lever of the second machine displacements identical to those of said lever of the first machine, a spring mounted in said second machine so that variations of the tension of said spring produce variations of the load applied to said test-piece of said second machine, an electric servo-motor included in said second machine operatively connected with said spring so as to increase or reduce the tension thereof according as said servo-motor is run in one direction or the other, two contacts carried respectively by said levers of said amplifying means of said second machine, means operative by said contacts for controlling said servo-motor to cause it to run in one direction when said contacts touch each other and in the other direction when said contacts do not touch each other, and means for measuring the variations of the tension of said spring.

7. An apparatus according to claim 6 further including two recording means belonging respectively to said first and said second machines, the first of said recording means being mounted to record the variations of length of the test-piece of said first machine, and the other one being mounted to record the variations of the tension of said spring.

8. An apparatus according to claim 2 further including casings surrounding said test-pieces and adapted to contain a neutral gas.

References Cited in the file of this patent
UNITED STATES PATENTS

| | | |
|---|---|---|
| 1,766,775 | Chevenard | June 24, 1930 |
| 2,290,868 | Eriksson | July 28, 1942 |